United States Patent
Kaplan et al.

(10) Patent No.: US 9,930,481 B2
(45) Date of Patent: Mar. 27, 2018

(54) SWITCHING MOBILE DEVICES TO AUTO-SILENT MODE

(71) Applicant: International Business Machines Corporation, Armonk, NY (US)

(72) Inventors: Philippe Kaplan, Le Rouret (FR); Georges-Henri Moll, Villeneuve-Loubet (FR); Xavier A. Nodet, Antibes (FR); Olivier Oudot, Vallauris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/062,457

(22) Filed: Mar. 7, 2016

(65) Prior Publication Data
US 2017/0257735 A1 Sep. 7, 2017

(51) Int. Cl.
*H04W 8/18* (2009.01)
*H04W 4/02* (2009.01)
*G06F 3/16* (2006.01)

(52) U.S. Cl.
CPC .............. *H04W 4/02* (2013.01); *G06F 3/165* (2013.01)

(58) Field of Classification Search
CPC ........... H04W 4/02; H04W 4/04; H04W 4/22; H04W 76/007; H04M 1/72577; H04M 1/72572
USPC ................ 455/404.1–404.2, 415, 456.1–457
See application file for complete search history.

(56) References Cited

U.S. PATENT DOCUMENTS

| | | | |
|---|---|---|---|
| 7,853,297 B1 * | 12/2010 | Fujisaki | H04M 1/274516 455/550.1 |
| 8,594,738 B2 | 11/2013 | Cook et al. | |
| 2005/0136837 A1 * | 6/2005 | Nurminen | H04L 67/16 455/41.2 |
| 2006/0035649 A1 * | 2/2006 | Vargas | H04W 48/04 455/456.4 |
| 2006/0063563 A1 | 3/2006 | Kaufman | |

(Continued)

FOREIGN PATENT DOCUMENTS

CN 102629954 A 8/2012

OTHER PUBLICATIONS

Geetanjali et al., "Autosilent Mobile System", International Journal of Advanced Research in Computer Engineering & Technology (IJARCET), vol. 3, Issue 3, Mar. 2014, pp. 912-914, <http://ijarcet.org/wp-content/uploads/IJARCET-VOL-3-ISSUE-3-912-914.pdf>.

(Continued)

*Primary Examiner* — Nathan Taylor
(74) *Attorney, Agent, or Firm* — Alexa L. Ashworth; A. Imtiaz Billah

(57) ABSTRACT

Embodiments of the present invention provide systems and methods for controlling a mobile device of interest. In order to automatically turn or keep the ringer off for the mobile device of interest, the number of other mobile devices within a defined proximity and maintaining a minimum time threshold in the presence of the other mobile devices within the defined proximity are evaluated. Upon determining there is at least a minimum number of other mobile devices within the defined proximity and the mobile device of interest maintains the minimum time threshold in the presence of the other mobile devices within the defined proximity, the mobile device of interest automatically turns the ringer off.

15 Claims, 3 Drawing Sheets

(56) References Cited

U.S. PATENT DOCUMENTS

| | | | | |
|---|---|---|---|---|
| 2009/0088221 A1* | 4/2009 | Gilbert | .............. | H04M 1/72566 |
| | | | | 455/567 |
| 2010/0317371 A1* | 12/2010 | Westerinen | ....... | H04M 1/72566 |
| | | | | 455/456.6 |
| 2011/0053572 A1* | 3/2011 | Cook | ................ | H04M 1/72577 |
| | | | | 455/414.2 |
| 2013/0326209 A1* | 12/2013 | Dommalapati | ....... | G06F 9/4421 |
| | | | | 713/100 |
| 2015/0011195 A1* | 1/2015 | Li | ........................... | H03G 3/32 |
| | | | | 455/418 |
| 2015/0079962 A1* | 3/2015 | Baker | .................... | H04W 8/18 |
| | | | | 455/418 |
| 2015/0087282 A1* | 3/2015 | Prajapat | ................ | H04M 19/04 |
| | | | | 455/418 |
| 2016/0112833 A1* | 4/2016 | Baratz | .................... | H04W 4/02 |
| | | | | 455/456.6 |

OTHER PUBLICATIONS

Wong, "How to Automatically Silence & Restore Your Phone to Ringer Mode [Android]", Sep. 4, 2012, pp. 1-4, <http://www.makeuseof.com/tag/how-to-automatically-silence-restore-your-phone-to-ringer-mode-android/>.

"Method to detect and switch mobile phones in silent mode based on local peer behavior", An IP.com Prior Art Database Technical Disclosure, IP.com No. 000216753, Apr. 17, 2012, pp. 1-3.

* cited by examiner

SWITCHING MOBILE DEVICES TO AUTO-SILENT MODE

BACKGROUND OF THE INVENTION

The present invention relates generally to the field of telecommunications technology and more specifically to automatically switching mobile devices to a silent mode when several people are in the same location.

Mobile devices are rather ubiquitous as many people own and use mobile devices. By definition, mobile devices are telephone devices by which a user can make and receive calls over a radio frequency while the user is moving within a telephone service area. As a result, mobile devices can prove to be extremely useful. However, due to the public use nature of mobile devices, a degree of etiquette needs to be exercised.

SUMMARY

One embodiment of this present invention, a method for controlling a mobile device is provided, the method comprising: at a location, detecting, by a first mobile device, one or more other mobile devices; determining, by one or more processors, whether a set of threshold parameters associated with the first mobile device are met; and responsive to determining that the set of threshold parameters associated with the first mobile device are met, activating, by one or more processors, an auto-silent mode within the first mobile device.

Another embodiment of the present invention provides a computer system for controlling a mobile device.

Another embodiment of the present invention provides a computer program product for controlling a mobile device.

DETAILED DESCRIPTION

Mobile device usage can be construed as annoying for other people if not used thoughtfully. Many "mobile usage policy" documents have been published, in particular by various companies for company employees, in an attempt to control the noise/disruptions to the workplace, which may be caused by mobile device usage. For example, meetings can be disturbed by a participant who forgets to put the mobile device in silent mode. This invention proposes a method which automatically switches the mobile device to "silent" mode when several persons are in a common location.

Figure 1:
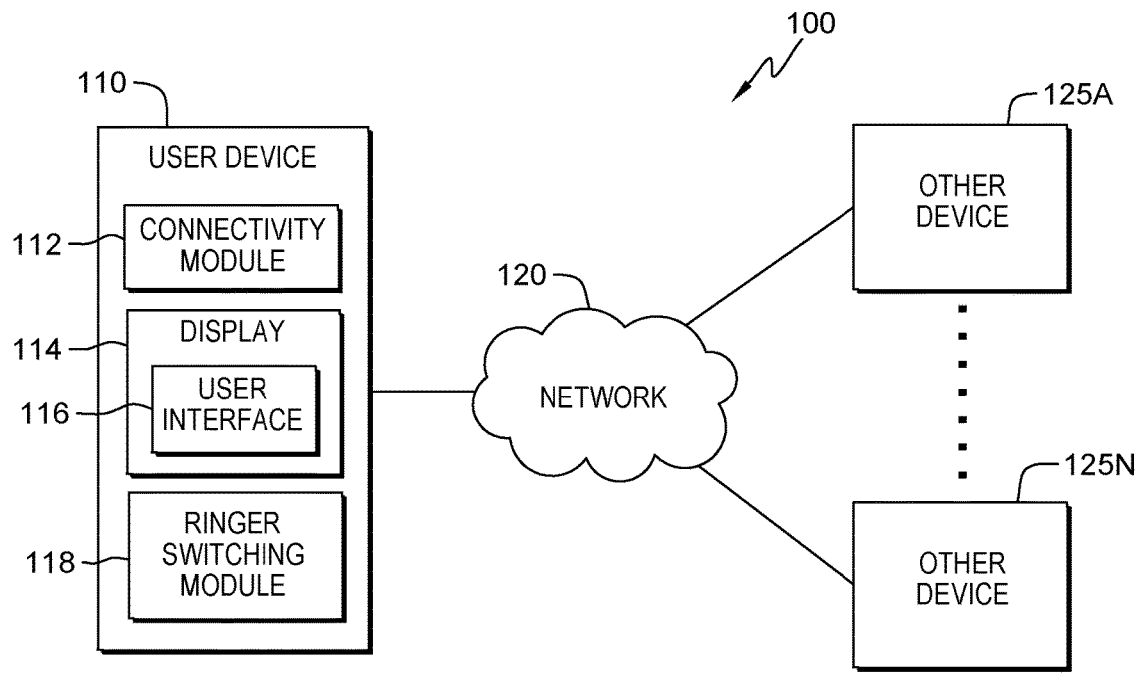
FIG. 1 is a functional block diagram illustrating a communication processing environment, in accordance with an embodiment of the present invention.

The present invention will now be described in detail with reference to the Figures. FIG. 1 is a functional block diagram illustrating a communication processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes user device 110 and other devices 125A-N, interconnected via network 120.

Network 120 may be a local area network (LAN), a wide area network (WAN) such as the Internet, the public switched telephone network (PSTN), a mobile data network (e.g., wireless Internet provided by a third or fourth generation of mobile device communication), a private branch exchange (PBX), any combination thereof, or any combination of connections and protocols that will support communications between user device 110 and other devices 125A-B, in accordance with embodiments of the invention. Network 120 may include wired, wireless, fiber optic connections, or other communication modes (e.g., GSM, 4G, Wi-Fi, Bluetooth, NFC, GPS, etc.)

User device 110 and other devices 125A-N are mobile devices. In other embodiments, user device 110 and other devices 125A-N may be a laptop computer, a tablet computer, a thin client, or personal digital assistant (PDA). In general, user device 110 and other devices 125A-N may be any electronic mobile device or mobile computing system capable of sending and receiving data over network 120. User device 110 and other devices 125A-N may include internal and external hardware components, as depicted and described in further detail with respect to FIG. 5. User device 110 contains connectivity module 112, display 114, user interface 116, and ringer switching module 118. Other devices 125A-N may also contain connectivity module 112, display 114, and user interface 116 (even though it is not depicted in FIG. 1).

In this exemplary embodiment, connectivity module 112 contains a baseband processor which manages all the radio or any functions that require an antenna, such as Wi-Fi and Bluetooth functions, for connecting to a wireless network, such as the Internet, and for connecting to other devices. Connectivity module 112 includes a subscriber identification module (SIM) which protects, identifies, and authenticates the identity of the user of the device.

In this exemplary embodiment, display 114 may be composed of, for example, a liquid crystal display screen, an organic light emitting diode display screen, or other types of display screens. Display 114 contains user interface (UI) 116. In an embodiment, display 114 consists of a screen where the screen (which may have touch screen capability) is composed of an insulator such as glass coated with a transparent electrical conductor, such as indium titanium oxide.

User interface 116 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 116 is capable of receiving data, user commands, and data input modifications from a user.

Ringer switching module 118 is an application which automatically switches a mobile device to the silent mode. The automatic switch to silent mode (i.e., the auto-silent mode) is based upon the proximity of other mobile devices (e.g., other devices 125A-N); the number of other mobile devices (e.g., other devices 125A-N); information/data provided by telecommunication adapters present in the mobile device (e.g., GSM, 4G, Wi-Fi, Bluetooth, NFC, GPS, etc.); and a configured minimum time threshold in the presence of other mobile devices. When user device 110 is configured to a silence mode or auto-silence mode, ringer switching module 118 silences a ringer or vibration from any incoming calls, silences alerts such as push messages to a mobile device, and silences incoming SMS/text messages. Ringer switching module 118 can be configured to put user device 110 into the silent mode under appropriate conditions (such as a meeting or a conference) and to switch user device 110 out of silent mode under appropriate conditions (such as walking in a crowd).

Figure 2:
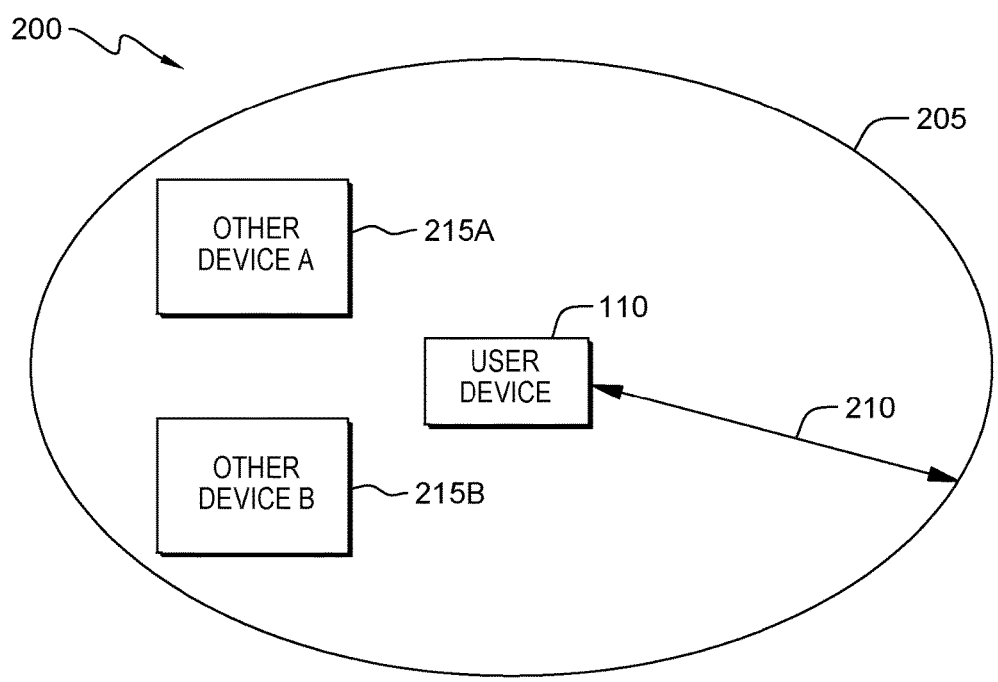
FIG. 2 is a depiction of ringer switching module 118 taking into consideration the radius and the number of mobile devices present within an amount of time, in accordance with an embodiment of the present invention.

FIG. 2 is a depiction of ringer switching module 118 taking into consideration the radius and the number of mobile devices present within an amount of time, in accordance with an embodiment of the present invention.

The mobile device is configured to select a minimum number of other mobile devices to be detected in a given proximity. In this example, the minimum number of other mobile devices to be detected is two (2) within the configured area 205, which has a preconfigured radius 210 from the user device 110. Mobile device telecommunication adapters within user device 110 detect the presence of other mobile devices within area 205 via GSM, 4G, Wi-Fi, Bluetooth, NFC, GPS, or other techniques. As other device 215A and other device 215B are within area 205, the silent mode is activated automatically. Another parameter for activating silent mode within user device 110 is that user device 110 must spend at least a minimum duration of time in the presence of the other mobile devices. If at least two other mobile devices (i.e., other devices 215A-B) are no longer within area 205 or user device 110 does not meet a minimum duration of time in the presence of the other mobile devices, then ringer switching module 118 does not automatically activate the silent mode.

Figure 3:
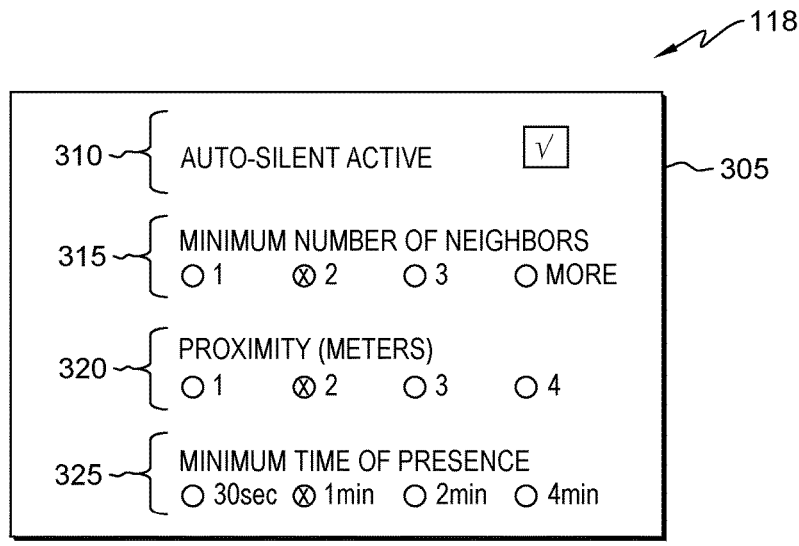
FIG. 3 is a depiction of a mobile device configured to be in auto-silent mode, in accordance with an embodiment of the present invention.

FIG. 3 is a depiction of a mobile device configured to be in an auto-silent mode, in accordance with an embodiment of the present invention.

Ringer switching module 118 outputs a configuration menu to the user of user device 110. Screen display 305 indicates: the auto-silent active mode is activated (see sub-section 310); user device 110 looks for at least two (2) mobile devices (see sub-section 315) within a specified proximity (i.e., radius) of two (2) meters of user device 110 (see sub-section 320); and the one (1) minute minimum time of presence of other mobile devices within the specified proximity of user device 110 (see sub-section 325). The ability to detect other mobile devices within a proximity (i.e., radius) depends on the capacity of the adapters.

As depicted in FIG. 3, the minimum threshold of other mobile devices which need to be found within the defined proximity and the minimum time of presence threshold are: two (2) other mobile devices within two (2) meters of user device 110 and one (1) minute, respectively. In one example, the auto-silent conditions are met if three (3) other mobile devices are detected by ringer switching module 118 within two (2) meters of user device 110, where user device 110 is in the presence of the other three (3) mobile devices for two (2) minutes.

In another example, the auto-silent conditions are not met if three (3) other mobile devices are found by ringer switching module 118 within two (2) meters of user device 110, where user device 110 is in the presence of the three (3) other mobile devices for 30 seconds within two (2) meters of user device 110. Not all the conditions for auto-silent mode are met in this example, as the minimum time of presence threshold of at least one (1) minute is not met.

Figure 4:
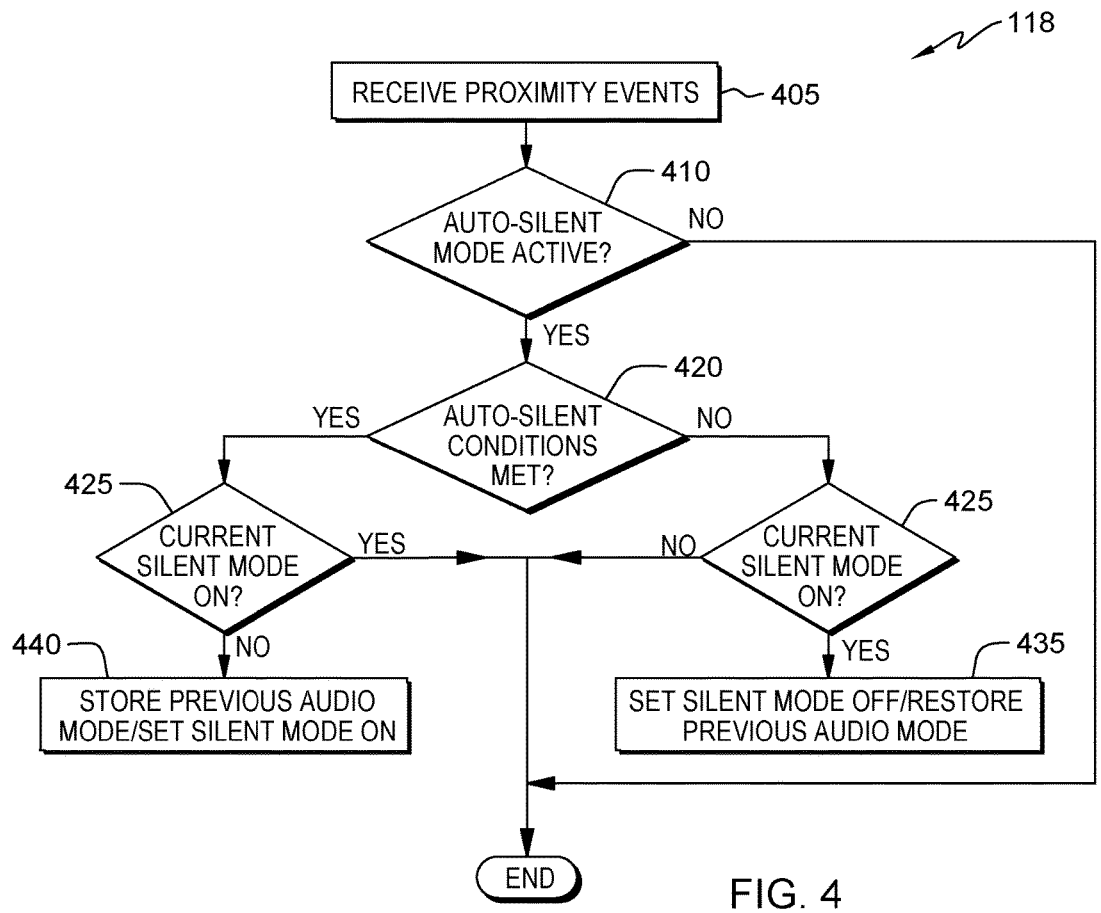
FIG. 4 is a flowchart depicting the operational steps for controlling the silent mode of a mobile device, in accordance with an embodiment of the present invention.

FIG. 4 is a flowchart depicting the operational steps for controlling the silent mode of a mobile device, in accordance with an embodiment of the present invention.

In step 405, ringer switching module 118 receives a set of proximity events. To automatically switch a mobile device in silent mode via ringer switching module 118, the conditions which need to be met include: (i) detecting at least a preconfigured number of other mobile devices within a defined proximity via existing telecommunication adapters present in the mobile device; and (ii) maintaining a minimum duration of time in the presence of the preconfigured number of other mobile devices within the defined proximity. Ringer switching module 118 is activated only upon meeting the sufficient conditions for activation and when the sufficient conditions are maintained. For example, the user can walk in a crowd and the user's device remains in a normal mode and does not automatically activate the silent mode. While walking in the crowd, the sufficient conditions for activation of the auto-silent mode are not maintained (i.e., minimum duration of time in the presence of other mobile devices) and the user device remains in the normal mode (i.e., the previous ringer status). When going through a crowd, the conditions to force ringer off via the auto-silent mode are never reached because people are always moving. Functionalities which are not performed by ringer switching module 118 to put a mobile device in silent mode include: the direct communication with other mobile devices; the utilization of an external signal to mark the entrance/exit in a "mobile device quiet" location; the triggering of a silent mode according to a location, a time, scheduled events, or calendar events; and the analysis of external sounds. As stated earlier, the location of other mobile devices within a defined/preconfigured vicinity triggers the silent mode.

In step 410, ringer switching module 118 determines if the auto-silent mode is active. Ringer switching module 118 has a configuration display as shown in FIG. 3. A check-mark ("√") in sub-section 310 is indicative of user device 110 in auto-silent mode. An x-mark ("x") in sub-section 310 is indicative of user device 110 not in the auto-silent mode. Ringer switching module 118 determines whether the auto-silent conditions are met upon determining the auto-silent mode is active (i.e., the "Yes" branch). A further determination is made as to the number of mobile devices within the configured proximity of user device 110 and the elapsed time user device 110 is within the presence of the other mobile devices within the configured proximity.

In step 420, ringer switching module 118 determines if the auto-silent conditions are met upon determining the auto-silent mode is active. The determinations of ringer switching module 118 are based on: (i) a threshold of the minimum number of other mobile devices, and (ii) a minimum threshold of the duration of time in the presence of the other mobile devices within the configured proximity. Ringer switching module 118 makes determinations by comparing the preconfigured settings (as depicted in FIG. 3) with the actual number of other mobile devices/neighbors within the defined proximity and defined minimum time of presence of the other mobile devices/neighbors within the defined proximity.

In step 425, ringer switching module 118 determines if the current silent mode is on upon determining the auto-silent mode conditions are met (i.e., the Yes branch) or upon determining the auto-silent mode conditions are not met (i.e., the No branch). The current silent mode is not the auto-silent mode. A determination of whether user device 110 is in the silent mode is whether user device 110 is configured (by a user) to be in the silent mode. If the minimum threshold of the elapsed time, where user device 110 is in the presence of the minimum threshold number of the other mobile devices are found within the configured proximity, then the conditions of the auto-silent mode are met.

In step 435, ringer switching module 118 sets the silent mode off and restores the previous audio mode upon determining the current silent mode is on (step 425) and upon determining the auto-silent conditions have not been met (step 420). This step activates the auto-silent mode, while also storing the current mode (i.e., the mode the mobile device was in before auto setting the silent mode), which is able to restore the previous mode when leaving the "auto-silent mode" (in step 435). The silent mode is determined to be on at step 430 (i.e., the Yes branch) and ringer switching module 118 is able to set the silent mode off. This is necessary to take into account the cases where user device 110 is in the silent mode for any reason. This silent mode status can be restored when leaving the auto-silent mode.

In step 440, ringer switching module 118 stores the previous audio mode and sets the silent mode on upon determining the current silent mode is not on (step 425) and upon determining the auto-silent conditions have been met (step 420). This step activates the auto-silent mode, while also storing the current mode, which is able to be restored when leaving the "auto-silent mode" (in step 440). This is necessary to take into account the cases where user device 110 is not in the silent mode for any reason. This non-silent mode status can be restored when leaving the auto-silent mode. For example, when restoring a previous audio mode (after ringer switching module 118 determines that the auto-silent mode does not need to be activated) and thus notifications are sent to the user such that the user can hear a ring tone and/or feel a vibration upon receiving an incoming call, push messages, or a text/SMS.

Ringer switching module 118 ends further processing upon determining the auto-silent mode is not active (i.e., the "No" branch to step 410). In this instance, an x-mark ("x") in sub-section 310 is present which is indicative that user device 110 is not in the auto-silent mode.

Ringer switching module 118 ends further processing upon determining the auto-silent conditions are met (step 420) and upon determining the current silent mode is on (step 425). Since the current silent mode is already active and the conditions for meeting the auto-silent mode are met, ringer switching module 118 cannot perform further processing.

Ringer switching module 118 ends further processing upon determining the auto-silent conditions are not met (step 420) and upon determining the current silent mode is not on (step 425). Since the current silent mode is not already active and the conditions for meeting the auto-silent mode are not met, ringer switching module 118 cannot perform further processing.

Figure 5:
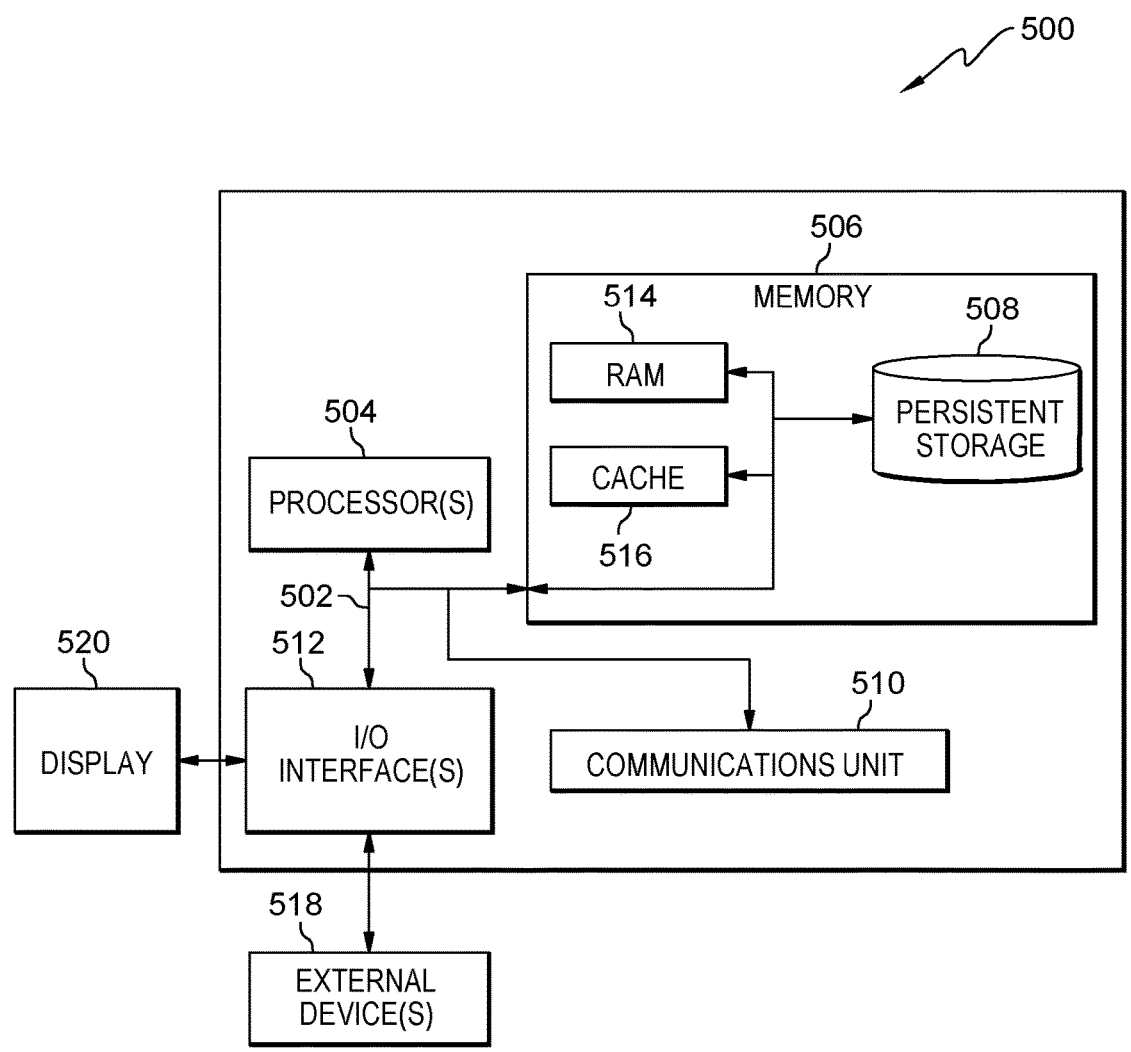
FIG. 5 depicts a block diagram of internal and external components of a computing device, in accordance with an embodiment of the present invention.

FIG. 5 depicts a block diagram of internal and external components of computing device 500, such as the mobile devices of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Program instructions and data used to practice embodiments of the present invention may be stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 120. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling a mobile device, the method comprising:
    detecting, by a first mobile device, one or more other mobile devices at a location, wherein in the first mobile device is able to activate or deactivate: a silent mode, a non-silent mode, an auto-silent mode, and a non-auto-silent mode;
    continuously monitoring, by the first mobile device, a set of threshold parameters that include: a presence or absence of the one or more other mobile devices within a specified proximity to the first mobile device, and an elapsed time period;
    responsive to identifying that the threshold parameters are satisfied, activating, by one or more processors of the first mobile device, the auto-silent mode in the first mobile device, which overrides the activation of the non-silent mode and the non-auto-silent mode in the first mobile device;
    responsive to identifying that at least one of the threshold parameters is not satisfied, activating, by one or more processors, the non-auto-silent mode, which overrides the activation of the silent mode and the auto-silent-mode in the first mobile device;
    responsive to determining the first mobile device is activating the auto-silent mode storing, by one or more processors, a current audio mode, wherein the current audio mode is the silent mode or the non-silent mode; and
    responsive to determining the first mobile device is deactivating the auto-silent mode is, re-storing, by one or more processors, the current audio mode.

2. The method of claim 1, wherein detecting the one or more other mobile devices, comprises:
    utilizing, by one or more processors, receptors on the first mobile device to detect signals of the one or more other mobile devices within the specified proximity to the first mobile device.

3. The method of claim 1, further comprising:
    responsive to detecting one or more changes in the set of threshold parameters after the elapsed time period parameter has been met, deactivating, by one or more processors, the auto-silent mode on the first mobile device.

4. The method of claim 1, wherein the set of threshold parameters associated with the first mobile device are met when a set of current condition values equals or exceeds the presence or the absence of the one or more other mobile devices within the specified proximity to the first mobile device, and the elapsed time period parameter values.

5. The method of claim 1, further comprising:
    responsive to determining the first mobile device is deactivating the silent mode, activating, by one or more processors, the auto-silent mode.

6. A computer system for controlling a mobile device, the computer system comprising:
    one or more computer processors;
    one or more computer readable storage media;
    program instructions stored on the one or more computer readable storage media for execution by at least one of the one or more processors, the program instructions comprising:
    program instructions for a first mobile device to detect one or more other mobile devices at a location, wherein in the first mobile device is able to activate or deactivate: a silent mode, a non-silent mode, an auto-silent mode, and a non-auto-silent mode;
    program instructions to continuously monitor a set of threshold parameters that include: a presence or absence of the one or more other mobile devices within a specified proximity to the first mobile device, and an elapsed time period;
    responsive to identifying that the threshold parameters are satisfied, program instructions to activate the auto-silent mode, which override activation of the non-silent mode and the non-auto-silent mode in the first mobile device;
    responsive to identifying that at least one of the threshold parameters is not satisfied, program instructions to activate the non-auto-silent mode, which overrides activation of the silent mode and the auto-silent mode in the first mobile device;
    responsive to determining the first mobile device is activating the auto-silent mode, program instructions to store a current audio mode, wherein the current audio mode is the silent mode or the non-silent mode; and
    responsive to determining the first mobile device is deactivating the auto-silent mode, program instructions to activate the current audio mode.

7. The computer system of claim 6, wherein program instructions to detect the one or more other mobile devices, comprises:
    program instructions to utilize receptors on the first mobile device to detect signals of the one or more other mobile devices within the specified proximity to the first mobile device.

8. The computer system of claim 6, further comprising:
    responsive to detecting one or more changes in the set of threshold parameters after the elapsed time period parameter has been met, program instructions to deactivate the auto-silent mode on the first mobile device.

9. The computer system of claim 6, wherein the set of threshold parameters associated with the first mobile device are met when the set of current condition values equals or exceeds presence or the absence of the one or more other mobile devices within the specified proximity to the first mobile device, and the elapsed time period parameter values.

10. The computer system of claim 6, further comprises:
    responsive to determining the first mobile device is deactivating the silent mode, program instructions to activate the auto-silent mode.

11. A computer program product for controlling a mobile device, the computer program product comprising:
    a computer readable storage medium and program instructions stored on the computer readable storage medium, the program instructions comprising:
    program instructions for a first mobile device to detect one or more other mobile devices at a location, wherein in the first mobile device is able to activate or deactivate: a silent mode, a non-silent mode, an auto-silent mode, and a non-auto-silent mode;
    program instructions to continuously monitor a set of threshold parameters that include: a presence or absence of the one or more other mobile devices within a specified proximity to the first mobile device, and an elapsed time period;
    responsive to identifying that the threshold parameters are satisfied, program instructions to activate the auto-silent mode, which override activation of the non-silent mode and the non-auto-silent mode in the first mobile device;
    responsive to identifying that at least one of the threshold parameters is not satisfied, program instructions to activate the non-auto-silent mode, which overrides activation of the silent mode and the auto-silent mode in the first mobile device;

responsive to determining the first mobile device is activating the auto-silent mode, program instructions to store a current audio mode, wherein the current audio mode is the silent mode or the non-silent mode; and responsive to determining the first mobile device is deactivating the auto-silent mode, program instructions to activate the current audio mode.

12. The computer program product of claim 11, wherein program instructions to detect the one or more other mobile devices, comprises:

program instructions to utilize receptors on the first mobile device to detect signals of the one or more other mobile devices within the specified proximity to the first mobile device.

13. The computer program product of claim 11, further comprising:

responsive to detecting one or more changes in the set of threshold parameters after the elapsed time period parameter has been met, program instructions to deactivate the auto-silent mode on the first mobile device.

14. The computer program product of claim 11, wherein the set of threshold parameters associated with the first mobile device are met when the set of current condition values equals or exceeds presence or the absence of the one or more other mobile devices within the specified proximity to the first mobile device, and the elapsed time period parameter values.

15. The computer program product of claim 11, further comprises:

responsive to determining the first mobile device is deactivating the silent mode, program instructions to activate the auto-silent mode.

* * * * *